(12) United States Patent
Zhao et al.

(10) Patent No.: US 8,805,329 B2
(45) Date of Patent: Aug. 12, 2014

(54) METHOD AND SYSTEM FOR ASSIGNING HOME AGENT

(75) Inventors: Jie Zhao, Shenzhen (CN); Jixing Liu, Shenzhen (CN); Jie Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 823 days.

(21) Appl. No.: 12/247,855

(22) Filed: Oct. 8, 2008

(65) Prior Publication Data

US 2009/0044257 A1 Feb. 12, 2009

Related U.S. Application Data

(63) Continuation of application No. PCT/CN2007/000728, filed on Mar. 7, 2007.

(30) Foreign Application Priority Data

May 13, 2006 (CN) .......................... 2006 1 0060696

(51) Int. Cl.
*H04M 1/66* (2006.01)

(52) U.S. Cl.
USPC .......................................... 455/411; 370/338

(58) Field of Classification Search
USPC ........................................................ 455/441
See application file for complete search history.

(56) References Cited

U.S. PATENT DOCUMENTS

| 8,180,349 | B1 * | 5/2012 | Mohan et al. | 455/437 |
| 2002/0145993 | A1 * | 10/2002 | Chowdhury et al. | 370/338 |
| 2002/0186693 | A1 * | 12/2002 | Inoue et al. | 370/389 |
| 2004/0133682 | A1 | 7/2004 | De Vriendt et al. | |

(Continued)

FOREIGN PATENT DOCUMENTS

| CN | 1496661 | 5/2004 |
| CN | 1770742 | 5/2006 |
| CN | 101313627 A | 11/2008 |
| EP | 1429514 | 6/2004 |

OTHER PUBLICATIONS

Chowdhury, K., et al., "MIP6-bootstrapping via DHCPv6 for the Integrated Scenario; draft-ietf-mip6-bootstrapping-integrated-dhc-00.txt," Internet Engineering Task Force, Network Working Group, Internet-Draft, Oct. 16, 2005, 20 pages, The Internet Society.

(Continued)

*Primary Examiner* — Marcos Batista
(74) *Attorney, Agent, or Firm* — Slater & Matsil, L.L.P.

(57) ABSTRACT

The invention discloses a method and system for assigning a home agent, and the method includes: indicating, by a visited network, to a home network that the visited network supports the home agent assignment; receiving, by the visited network, authorization information from the home network, the authorization information indicates the visited network is authorized for assigning the home agent; and sending, by the visited network, information about an address of the home agent to a mobile node. The invention can remedy the drawback that the home agent can be assigned to the mobile node only in the home network, thus improving the communication efficiency and reducing the delay. Further, an effective control can be enforced on assignment, so that the visited network can indicate to the home network whether it can support assigning of the home agent, and the home network can enforce a control on whether to perform assignment in the visited network.

13 Claims, 7 Drawing Sheets

(56) References Cited

U.S. PATENT DOCUMENTS

| | | |
|---|---|---|
| 2004/0157585 A1* | 8/2004 | Sashihara ............... 455/411 |
| 2007/0202873 A1* | 8/2007 | Yegani et al. ............ 455/433 |
| 2009/0044257 A1 | 2/2009 | Zhao et al. |

OTHER PUBLICATIONS

Patel, A., et al., "Authentication Protocol for Mobile IPv6," Internet Engineering Task Force, Network Working Group, Request for Comments: 4285 (rfc 4285), Category: Informational, Jan. 2006, 18 pages, The Internet Society.

3rd Generation Partnership Project 2, "cdma2000 Wireless IP Network Standard: Introduction," 3GPP2 X.S0011-001-D, Version 1.0, Feb. 2006, 33 pages.

Giaretta, G., et al., "Mobile IPv6 bootstrapping in split scenario; draft-ietf-mip6-bootstrapping-split-02.txt," Internet Engineering Task Force, MIP6 WG, Mar. 3, 2006, 34 pages, The Internet Society.

Hsu, R., et al., "Mobile IP Enhancement," 3rd Generation Partnership Project 2 ("3GPP2") Contribution, Mar. 27, 2006, 20 pages.

Written Opinion of the International Searching Authority, International Application No. PCT/CN2007/000728, Applicant: Huawei Technologies Co., Ltd., et al., Date of mailing: Jun. 14, 2007, 8 pages.

International Search Report, International Application No. PCT/CN2007/000728, Date of mailing: Jun. 14, 2007, 4 pages.

Chinese Office Action, Chinese Application No. 200610060696.2, Date of mailing: Apr. 3, 2009, 8 pages.

Chinese Office Action, Chinese Application No. 200780000258.X, dated Sep. 26, 2010, 15 pages.

Chinese Rejection Decision, Chinese Application No. 200780000258.X, dated May 25, 2011, 18 pages.

Lu, et al., 2004. "A Solution of Temporary Home Agent for Mobile IP". Data Communication, Jun. 14, 2004, No. 4, p. 5, vol. 0-vol. 2, sec 2.1.

\* cited by examiner

METHOD AND SYSTEM FOR ASSIGNING HOME AGENT

CROSS REFERENCE OF RELATED APPLICATIONS

This application is a continuation of International Application No. PCT/CN2007/000728, filed Mar. 7, 2007, which claims the benefit of Chinese Patent Application No. 200610060696.2, filed with the Chinese Patent Office on May 13, 2006, entitled "METHOD FOR ASSIGNING HOME AGENT", both of which are incorporated herein by reference in their entireties.

FIELD OF THE INVENTION

The present invention relates to Mobile Internet Protocol (IP) technologies and in particular to a method and system for assigning a home agent.

BACKGROUND OF THE INVENTION

A CDMA2000 network, including CDMA2000 1x and a High Rate Packet Data (HRPD) system, requires its packet domain to support Mobile IP technologies, such as Mobile IPv6 technologies.

In the Mobile IPV6 technologies, a Mobile Node (MN) is provided with two IP addresses, one referred to as a Home Address (HoA), and the other referred to as a Care-of Address (CoA). During mobile communication, the HoA keeps unchanged all the time, and is used for maintaining continuity and reachability of the communication in the case that the MN moves to a foreign network. The CoA is assigned by the foreign network to the MN. When the MN is given a new CoA, this address shall be bound with the HoA on a Home Agent (HA), so that the HA can forward packets transmitted to the MN from another entity to the MN through a tunnel between the MN and the HA, and forward packets transmitted to the another entity from the MN to the another entity. Messages used in binding is Binding Update (BU) transmitted from the MN to the HA, and Binding Acknowledgement (BA) transmitted back from the HA. Here, binding of the MN is enforced directly with the HA. Further, in order to ensure security during binding, the Mobile IPv6 requires that a Security Association (SA) of IP security (IPsec) firstly be established between the MN and the HA, and the BU and the BA messages be protected using this security association. Typically, the MN needs to know an IP address of the HA for communicating with the HA.

Referring to FIG. 1, in the Mobile IPv6 of the conventional CDMA2000 network, a Mobile Station (MS) is the MN in the Mobile IPv6 technology, and in the case that the MS is not configured with information such as a home agent and a home address HoA or a Home Link (HL) prefix, the MS can obtain the information through a stateless Dynamic Host Configuration Protocol (DHCPv6). The detailed procedure is as follows.

a. The MS establishes a Point to Point Protocol (PPP) connection with a Packet Data Serving Node (PDSN), and performs PPP Challenge Handshake Authentication Protocol (CHAP) or Password Authentication Protocol (PAP) authentication, i.e. initiating an access authentication process.

b. The PDSN transmits Access-Request message of Remote Authentication Dial In User Service (RADIUS) to a home RADIUS server, which includes authentication information of the MS.

c. The home RADIUS server checks configuration information of a user to determine whether the user can be provided with Mobile IPv6 service and to verify the authentication information of the user. If the authentication information is correct, then the user is assigned an HA and a HoA.

d. The home RADIUS server transmits to the PDSN an Access-Accept message of RADIUS, which includes an address of the HA in an MIP6-Home Agent attribute and the HoA in an MIP6-Home Address attribute.

e. The PDSN receives the HA and the HoA from the home RADIUS server, and stores the information locally.

f. The PDSN transmits to the MS a message to indicate completion of the access authentication process.

g. The MS requests the MIP6-related information from the PDSN though an Information-request message of DHCPv6. A client identify option of the message further includes a Network Access Identifier (NAI) which the MS uses in access authentication procedure.

h. The PDSN searches for an appropriate record according to the NAI, and if it is found, then the PDSN transmits back to the MS a reply message, an 3GPP2 Vender option extension of which includes the address of the HA and the HoA.

Referring to FIG. 2, if the RADIUS server does not assign the HoA to the MS, then it can also inform the PDSN of a home link prefix. After obtaining the prefix from the PDSN, the MS can configure a HoA automatically. After obtaining the address of the HA and the HoA from the network through the above procedure, the MS can perform directly Mobile IP binding with the HA. This binding does not comply with requirement of the primary standard RFC3775 of MIP6 entirely, i.e. an IPsec SA being firstly established between the MS and the HA, and the messages BU and BA being protected by the SA, but instead adopts an authentication protocol as defined in the RFC4285. The detailed procedure is as follows.

a. The MS performs a process of establishing a link layer, and obtains MIP-related bootstrapping information (such as a home link prefix or an HA or a HoA) from the RADIUS server by way of the PDSN.

b. If the MS obtains a new HoA, then the MS may use the HoA, otherwise the MS may generate automatically a global uni-cast address as a HoA according to a home line prefix obtained from the RADIUS server.

c. The MS transmits Binding Update message to the HA, which includes an MN-AAA mobility message authentication option for the HA to check integrity of the message.

d. The HA obtains parameters such as an NAI of the MS and the MN-AAA mobility message authentication option from the Binding Update message, and also transmits these parameters to the RADIUS server of a home network through an Access Request message of RADIUS.

e. The RADIUS server of the home network uses a key shared between the MS and the server to verify the MN-AAA mobility message authentication option, and if the verification is successful, then it indicates that the message has not been forged or modified, i.e. the MS is a legal user, and thus a binding operation is performed. Thereafter, the RADIUS server calculates an Internet Key (IK) for protecting subsequent binding between the MS and the HA, and the MS can also compute IK in the same way as the RADIUS server.

f. The RADIUS server transmits to the HA an Access Accept message, an MIP6-Session Key extension of which includes the key IK.

g. The HA stores the received key IK, and performs a replay attack check according to an Mesg-ID mobile option in the Binding Update message.

h. The HA transmits to the MS an Binding Acknowledgment message including an MN-HA mobility message authentication option calculated with the IK, an MN-NAI mobile option, and the Mesg-ID mobile option. Upon reception of the BA, the MS may use the IK to check integrity of the message.

Referring to FIG. 3, an existing method, which can assign an HA to an MS in a visited network, uses an MIP6 bootstrapping technology to obtain dynamically an IP address of the HA. In this method, the MS and the HA negotiate an IPsec SA through IKEv2 (Internet Key Exchange version 2), so that the HA assigns a HoA to the MS according to an IKEv2-based address assignment function. The detailed procedure is as follows.

1. As in current specifications, the MS and a PDSN perform a PPP establishment process, and an HAAA authenticates the MS.

2. The PDSN acting as a default router transmits an IPv6 Router Advertisement message to the MS, and the MS obtains a unique prefix with a length of 64 bits.

3. The MS configures automatically a globally unique unicast IPv6 address using stateless address auto-configuration mechanism according to the obtained prefix.

4. The MS performs an MIP6 HA address bootstrapping process. If an Access Service Provider (ASP) and a Mobility Service Provider (MSP) are one provider, then the MS can obtain the address of the HA by stateless DHCPv6. If the access service provider and the mobility service provider are not same, then the MS can obtain the address of the HA through a DNS.

5. The MS and the HA exchange IKE_SA_INT messages, negotiate about IKE SA security parameters, and perform exchange of random numbers, and of DH parameters.

6. The MS transmits an IKE_AUTH message, which does not include AUTH payload, indicating that the MS expects authentication based an Extensible Authentication Protocol (EAP). The MS sets an INTERNAL_IP6_ADDRESS attribute in a CFG_REQUEST payload as 0, indicating a request for dynamic assignment of a HoA. The MS includes also in the message IDi and SAi payloads identifying respectively its own identity and the IPsec SA. The message is encrypted and integrity-protected using the IKE SA negotiated previously.

7. With an exchange of EAP messages, the MS and the HAAA accomplish mutual authentication via the HA. The EAP messages between the MS and the HA are encapsulated into an IKE_AUTH message. The EAP messages between the HA and the HAAA are encapsulated into a RADIUS message.

8. After EAP authentication has been performed successfully, the HA transmits to the MS the IKE_AUTH message, a CFG_REPLY payload of which includes the INTERNAL_IP6_ADDRESS attribute. This attribute is the HoA assigned by the HA to the MS. Also the message includes IDr and SAr as well as an AUTH payload. Authentication information in the AUTH payload is calculated using a Master Session Key (MSK) generated from EAP procedure in the step 7.

9. The MS and the HA exchange the MIP6 Binding Update and Binding Acknowledgement messages, and the CoA obtained in the step 3 and the HoA obtained in the step 7 by the MS are bound. These messages are protected by the previously IKEv2-negotiated IPsec SA.

10. The MS and the HA establish a bidirectional tunnel through which the MS transmits and receives IPv6 data packages.

SUMMARY OF THE INVENTION

An object of embodiments of present invention is to provide a method and system for assigning dynamically a home agent to a mobile terminal in a visited network.

A method for assigning a home agent includes:

indicating, by a visited network, to a home network that the visited network supports the home agent assignment;

receiving, by the visited network, authorization information from the home network, the authorization information indicates the visited network is authorized for assigning the home agent; and sending, by the visited network, information about an address of the home agent to a mobile node.

A method for assigning a home agent includes:

indicating, by a visited network, to a home network whether the visited network supports the home agent assignment;

receiving, by the visited network, a result from the home network, the result indicates the visited network is prohibited from assigning the home agent; and sending, by the visited network, information about an address of the home agent assigned by the home network to a mobile node.

A visited network includes a capability indication unit, a first control unit, a first transmission unit, and a first reception unit, in which:

the capability indication unit is adapted to transmit to the first control unit a capability request indicating whether the visited network supports the home agent assignment;

the first reception unit is adapted to receive a result of authorizing for assigning the home agent from a home network, and to send the authorization result to the first control unit;

the first control unit is adapted to send the capability request to the first transmission unit, and upon reception of the authorization result, to send information on an address of the home agent to the first transmission unit; and the first transmission unit is adapted to send the capability request to the home network, and the information on the address of the home agent to a mobile node.

A home network includes a second reception unit, a second control unit, and a second transmission unit, in which:

the second reception unit is adapted to send to the second control unit a received capability request indicating whether a visited network supports the home agent assignment;

the second control unit is adapted to, upon reception of the capability request, generate a result of authorizing the visited network for assigning the home agent, and to send the authorization result to the second transmission unit; and the second transmission unit is adapted to send the authorization result to the visited network.

A system for assigning a home agent includes a visited network and a home network, in which the visited network indicates to the home network whether the visited network supports the home agent assignment, and sends information about an address of the home agent to a mobile node after receiving a result of authorizing for assigning the home agent from the home network.

DETAILED DESCRIPTION OF THE EMBODIMENTS

Figure 1:
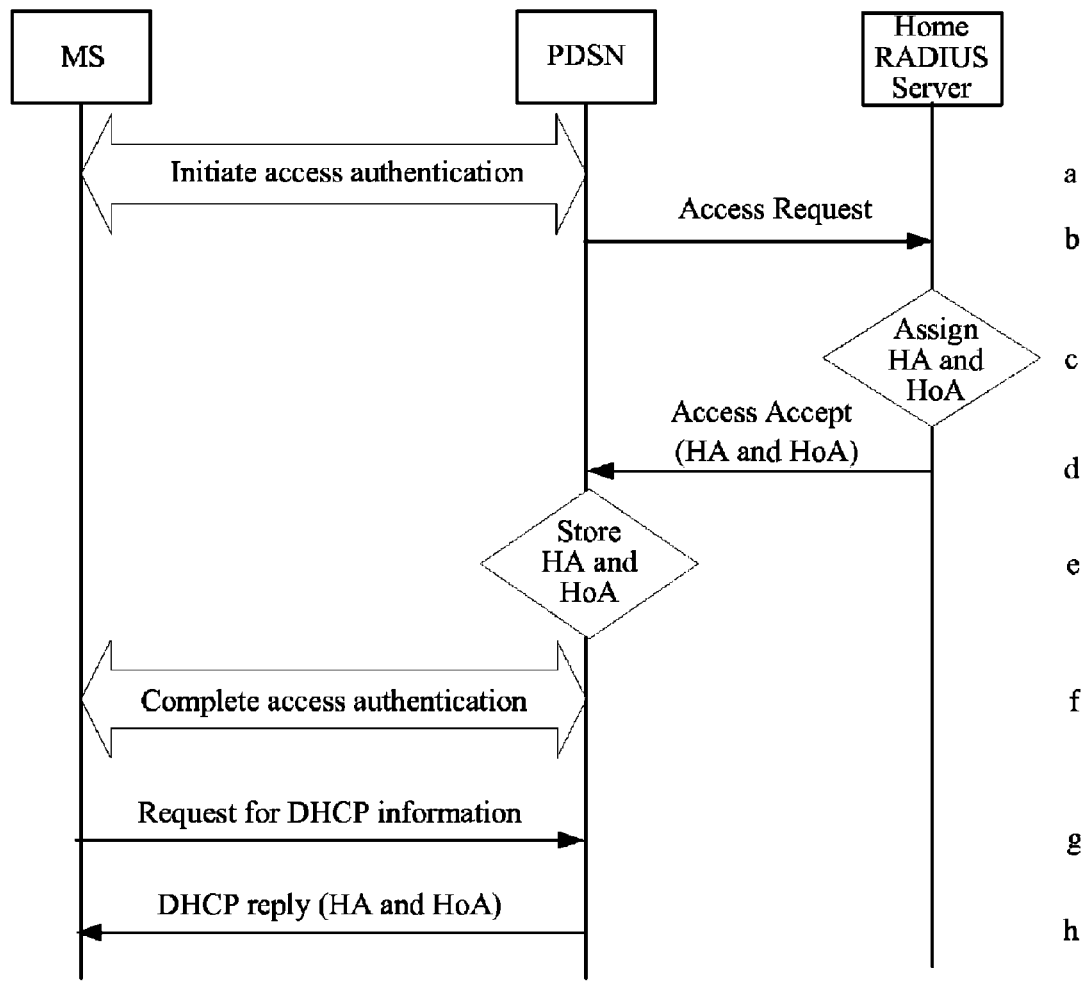
FIG. 1 is a schematic diagram of a method for an MS obtaining dynamically MIP6 information in the prior art.

In the conventional method for assigning home agent, the MS can obtain dynamically the IP address of the HA. However, the HA is located in the home network, and is assigned directly by the home RADIUS server. The HA located in the home network may be disadvantageous in that if the MS is far away from the home network, and no routing optimization is performed between the MS and a correspondence node (CN), then MS may establish a bidirectional tunnel with the HA, and the HA may forward all messages between the MS and the CN. The communication in such a case will be inefficient. Particularly if the CN itself is located in the same network as the MS, then packets transmitted from the MS has to be firstly passed to the remote home network, and then forwarded to the CN, thus resulting in a long time delay. Therefore, the communication efficiency would be improved greatly if HA is assigned directly to the MS in the visited network.

In the prior art, the MIP6 bootstrapping technology is used to perform dynamic assignment of an HA. The MIP6 bootstrapping technology divides service providers into an access service provider ASP and a mobility service provider MSP. The two providers may be one operator or two independent operators. Assignment of an HA can be enforced in either the ASP or the MSP. If the bootstrapping technology is used in a CDMA2000 network, then a network model and some concepts in bootstrapping shall also be mapped into the CDMA2000 network. However, the existing solutions have neither determined such mapping relationships nor defined what entities in bootstrapping correspond to entities in the CDMA2000 network. Assignment of the HA in a home network has not been distinguished from assignment of the HA in a visited network.

Compared with the prior art, the solutions according to the embodiments of the invention can remedy the drawback that a home agent can be assigned to the mobile node only in the home network, thus improving the communication efficiency and reducing the delay. Further, an effective control can be enforced on assignment procedure. The visited network can indicate to the home network whether it can support assigning of the home agent, and the home network can enforce a control on whether to authorize the assignment of home agent in the visited network.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Embodiments of the invention provide a method for assigning a home agent in which an MN gains an access to a visited network, obtains a CoA from the visited network, and obtains a HoA from reply information from the visited network. The MN binds the HoA and the CoA, and performs a binding update when the CoA is changed. Here, upon accessing the visited network, the MN transmits to a home network through the visited network an authentication request indicating whether the visited network is capable of assigning the HA; the home network verifies the request, and transmits a response to the visited network according to a user configuration. The visited network knows from the response a message whether it has been authorized for assigning the HA to the MN. The HoA can be obtained when an address of the HA is obtained, or can be assigned by the HA.

In the Mobile IPv6 of the conventional CDMA2000 network, a Mobile Station (MS) is the MN in the Mobile IPv6 technology, and the invention is described below in conjunction with the MS corresponding to the MN.

Figure 4:
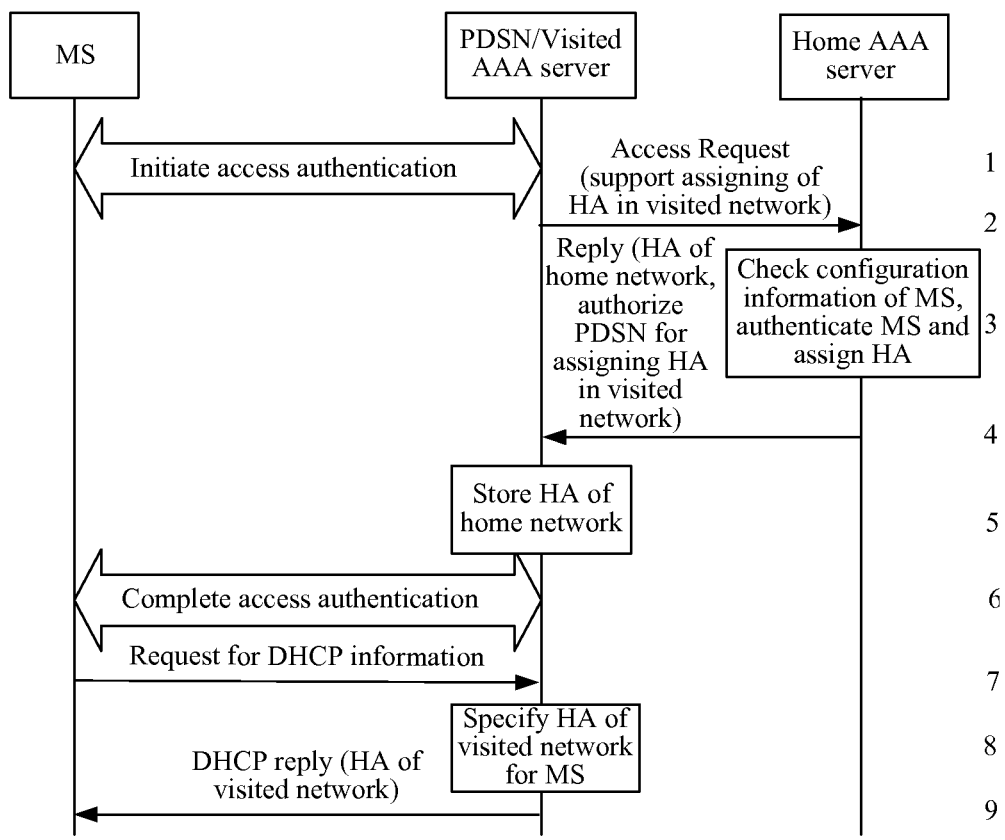
FIG. 4 is a schematic diagram of a flow for assigning dynamically an HA in a visited network according to an embodiment of the invention.

Referring to FIG. 4, in order to perform an effective control on whether an MS can visit an HA assigned by a visited network, a RADIUS server in a home network is configured to indicate that some MS is allowed or prohibited to visit the HA assigned by the visited network. The MS gains an access to the visited network, and the visited network transmits to the home network an authentication request including information indicative of whether the visited network is capable of assigning the HA. In the case that the visited network is capable of assigning the HA, and the MS is allowed to visit an HA assigned by the visited network, a home AAA server authorizes the visited network for assigning the HA. The detailed procedure is as follows.

1. The MS transmits authentication data to a PDSN, initiating an access authentication process.

2. The PDSN transmits the authentication data of the MS to a visited AAA server through a request message of an AAA protocol. The visited AAA server forwards the data to the home AAA server. In order to indicate that the visited network is capable of assigning the HA, the PDSN or the visited AAA server transmits information indicative of being provided with such a capability to the home AAA server.

3. The home AAA server checks configuration information of a user, i.e. a profile of the user, and finds that the user is an MIP6 user. The home AAA server verifies the authentication data of the user, and if correct, then assigns an HA to the user in the home network. Also the home AAA server finds that the received request message includes a parameter indicative of being capable of assigning the HA in the visited network, thus checks the configuration information of the user to see whether such an operation is allowed, and if allowed, then authorizes for assigning the HA to the MS in the visited network.

4. The home AAA server transmits a response message to the visited AAA server. The visited AAA server forwards to the PDSN the response message including information on whether to authorize for assigning the HA in the visited network, and also including an address of the HA assigned to the MS by the home network.

5. The PDSN receives the reply message, and knows from the message whether the home AAA server authorizes for assigning the HA in the visited network. If the home network assigns an address of the HA to the MS, then received HA information may be stored.

6. The PDSN transmits to the MS a message indicating completion of the access authentication process.

7. The MS requests the MIP6-related information from the PDSN through an Information-request message of DHCPv6, and a client identity option of the message further includes a Network Access Identifier (NAI) which the MS uses in access authentication procedure.

8. If the visited network is authorized to assign the MS an HA in the visited network, then an HA in the visited network is assigned to the MS. This operation may be done by the PDSN, or may be done by the visited AAA server or a DHCP server of the visited network, and then the PDSN can be informed of the HA.

9. The PDSN finds an appropriate record according to the NAI, and transmits back to the MS a reply message including an address of the assigned HA in the visited network to the MS.

In the step 2, the PDSN or the visited AAA server of the visited network also can transmit a list of HAs available in the visited network to the home AAA server. In the step 8, the visited network can assign an HA to the MS according to the list of available HAs.

In the step 7, the MS does not indicate explicitly that whether it expects to use an HA in the visited network or in the home network. However, since the visited network has been authorized for assigning the HA, the PDSN can transmit an HA assigned by the visited network to the MS. Alternatively, the PDSN can transmits both an HA assigned by the home network and an HA assigned by the visited network to the MS. In order to distinguish the two HAs, in the step 9, the PDSN shall use an identifier to indicate whether a specific HA is assigned in the visited network or in the home network. Upon reception of both the HA assigned by the home network and the HA assigned by the visited network, the MS can choose optionally one from the two HAs.

The MS can also indicate in the DHCP message of the step 7 whether it expects to visit an HA in the visited network or in the home network. If it expects to visit an HA in the home network, then the PDSN can transmit to the MS an address of an HA obtained from the home AAA server, and if it expects to visit an HA in the visited network, then the PDSN may inform the MS of an address of an HA in the visited network if the PDSN is capable of doing so.

In the step 9, what the PDSN transmits to the MS may be an address of an HA, may be a home subnet prefix, or may be a Fully Qualified Domain Name (FQDN) of the HA.

Figure 2:
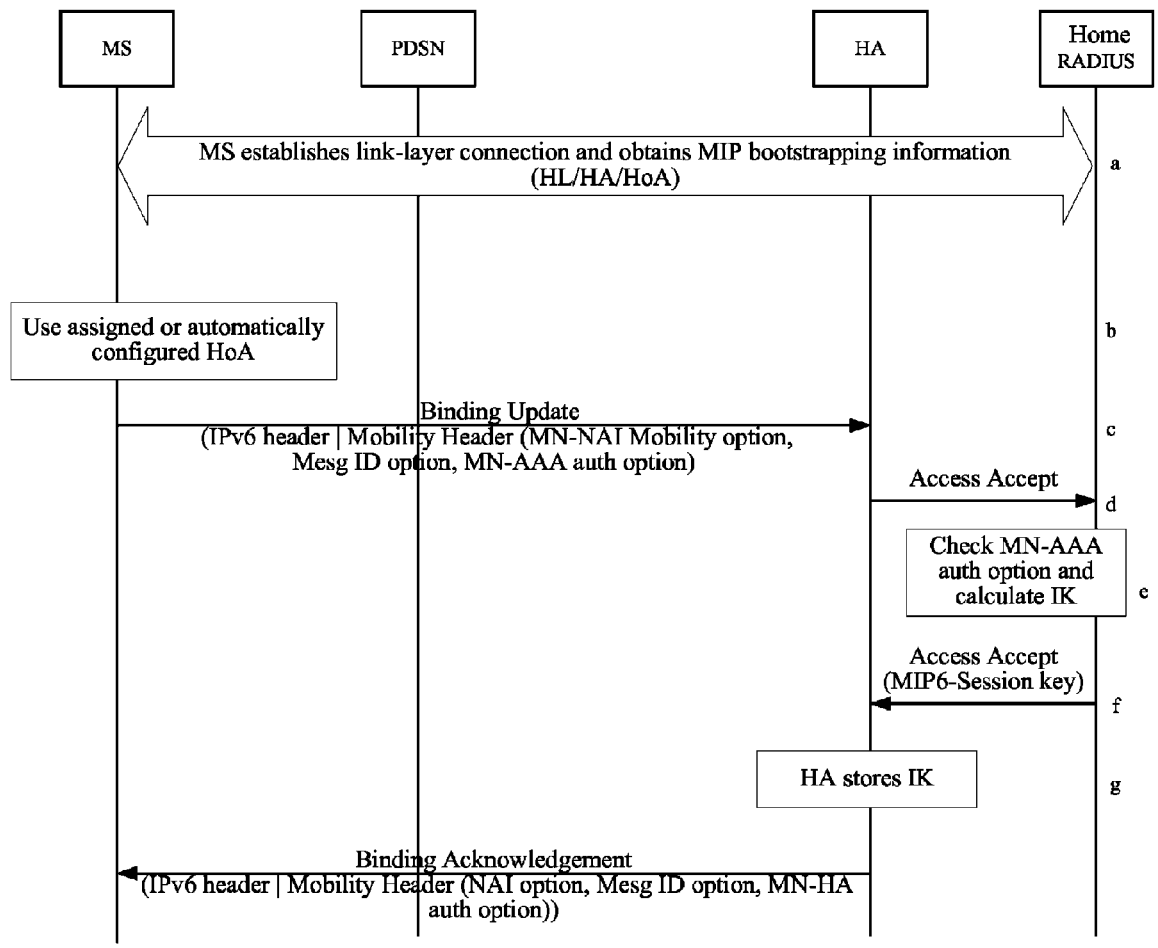
FIG. 2 is a schematic diagram of a method for an MS performing the MIP6 binding in the prior art.
Figure 3:
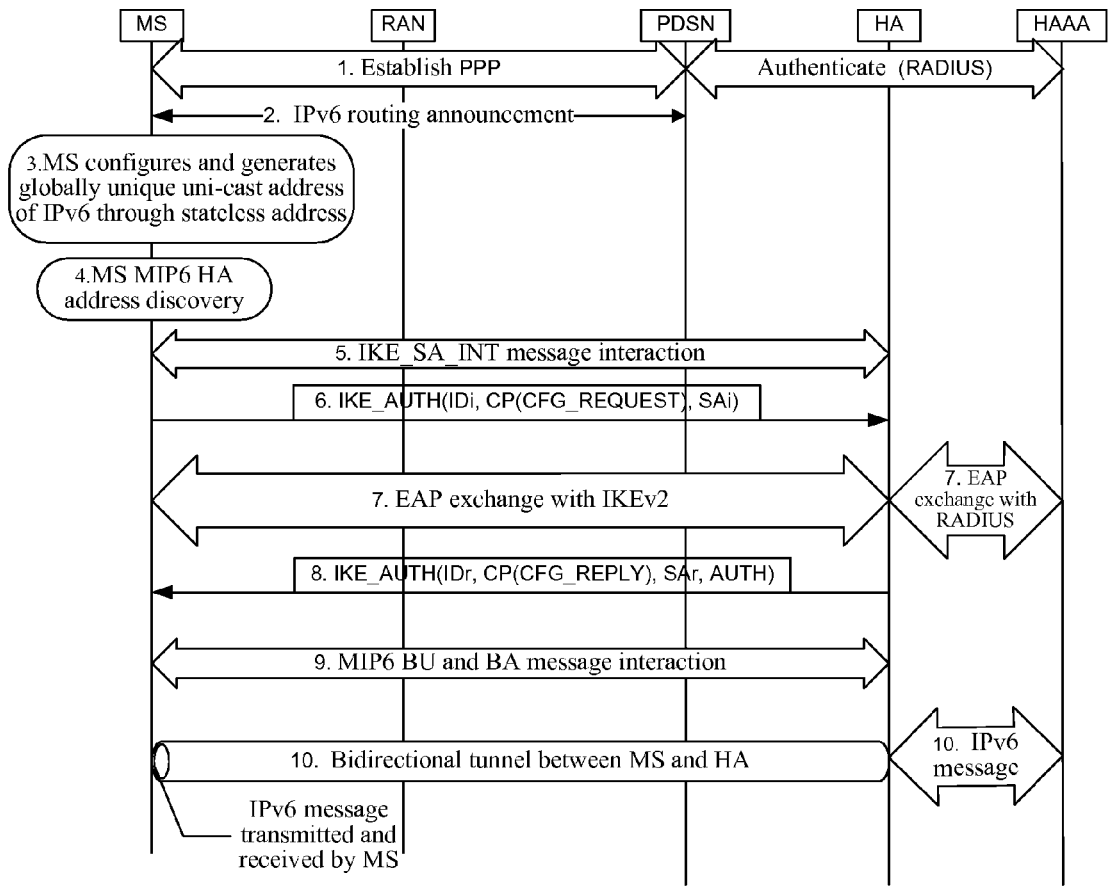
FIG. 3 is a schematic diagram of an enhanced MIP6 flow in a packet domain in the prior art.

After the dynamic assignment of HA is completed, an MIP binding process can be performed between the MS and the HA. An existing standard, i.e. the RFC 4285 authentication mechanism, as in the steps b to h of FIG. 2, can be adopted, or the IKEv2 negotiation of an IPsec SA can be performed, and then the MIP binding process can be protected by the SA, as in the steps 5 to 9 of FIG. 3.

In order to pass the information that the visited network is capable of assigning the HA and that the home network authorizes the visited network for assigning the HA, the invention embodiments shall extend the AAA protocol, such as RADIUS or DIAMETER, by adding new attribute(s). The RADIUS and DIAMETER can share one attribute extended newly, and different attribute values convey different meanings. Alternatively, two attributes can be added to represent respectively two kinds of information.

For further descriptions of the invention, specific embodiments thereof will be presented hereinafter.

Figure 5:
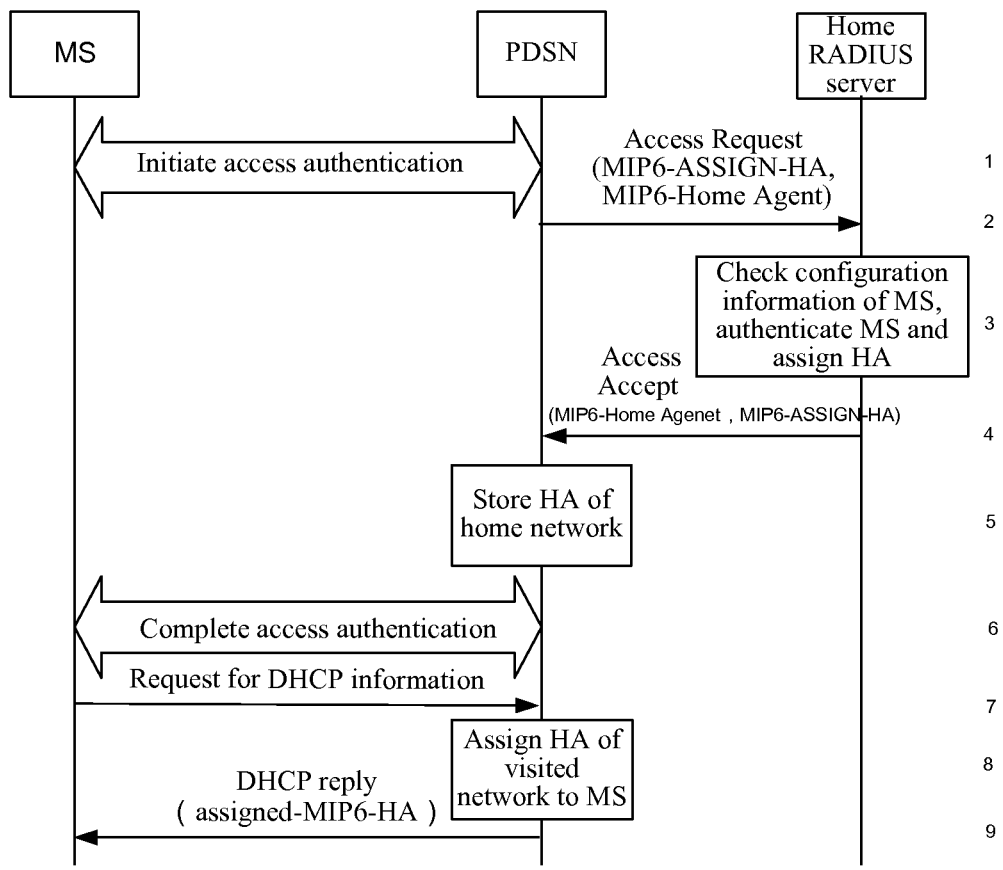
FIG. 5 is a schematic diagram of an example in which a visited network can support assigning of an HA, and a home network allows an MS to visit the HA assigned by the visited network according to an embodiment of the invention.

Referring to FIG. 5, the visited network can support assigning of the HA, and the home network allows the MS to visit the HA assigned in the visited network. A newly extended RADIUS attribute will be used in this embodiment.

1. The MS initiates an access authentication process, which may be a CHAP or PAP authentication process in establishing a PPP connection or the other authentication mechanisms performed by the MS with a PDSN, and the MS transmits authentication data to the PDSN.

2. The PDSN transmits the authentication data of the MS to an RADIUS server of the home network through an Access-Request message of the RADIUS protocol (the message shall be forwarded through an RADIUS server of the visited network, which is not illustrated). The message also includes a new extended attribute MIP-ASSIGN-HA, which takes a value of 1 indicating that the visited network where the MS is located supports assigning of the HA. Further, the PDSN also transmits a list of available HAs to the RADIUS server through an attribute MIP6-Home Agent.

3. The home RADIUS server checks configuration information of the MS, and finds that the MS is an MIP6 MS. The RADIUS server verifies the authentication data of the MS, and if correct, then assigns an HA to the MS in the home network. Also the RADIUS server finds that the received Access-Request message includes the extended attribute MIP-ASSIGN-HA taking the value of 1, thus checks the configuration information of the MS to determine whether such an operation is allowed, and if allowed, then authorizes for assigning an HA to the MS in the visited network.

4. The home RADIUS server transmits an Access-Accept message to the PDSN (the message shall be forwarded through the RADIUS server of the visited network, which is not illustrated). The message includes an address of the HA assigned by the home network, a value of which is placed in the attribute MIP6-Home Agent, and also includes the extended attribute MIP-ASSIGN-HA, which takes a value of 2 indicating that assigning of the HA is authorized in the visited network.

5. The PDSN receives the Access-Accept message, and stores received information of the HA assigned by the home network. The PDSN knows from the value of the attribute MIP-ASSIGN-HA that it has been authorized by the RADIUS server for assigning the HA in the visited network.

6. The PDSN transmits to the MS a message indicating completion of the access authentication process.

7. The MS requests the MIP6-related information from the PDSN through an Information-request message of DHCPv6, and id-type of a Home Network Identifier Option in the message is set as 0 indicating that the MS expects an HA to be assigned in the visited network. The message also includes an identity of the MS.

8. The PDSN specifies an HA for the MS from its list of local HAs. This HA is the HA assigned to the MS by the visited network.

9. The PDSN finds an appropriate record according to the identity of the MS, and transmits back to the MS a reply message including an address of the HA in the visited network assigned to the MS. Alternatively, the PDSN can transmits both an HA assigned by the home network and an HA assigned by the visited network to the MS. Upon reception of both the HA assigned by the home network and the HA assigned by the visited network, the MS can choose optionally one from the two HAs.

Figure 6:
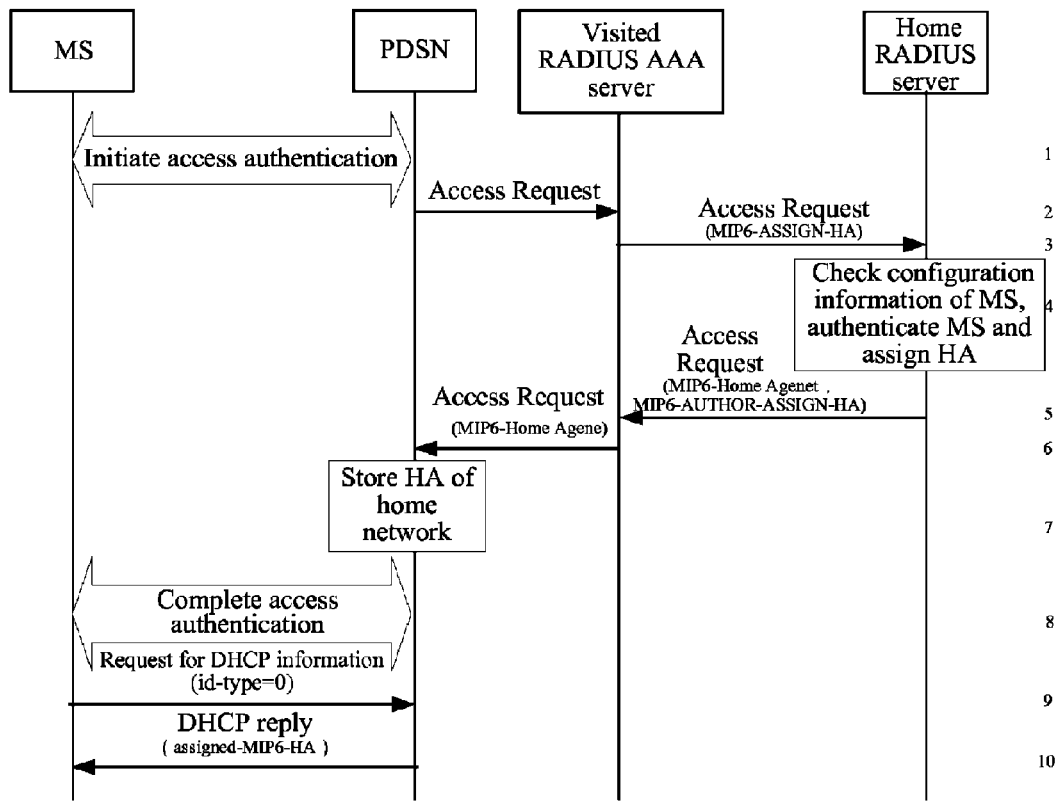
FIG. 6 is a schematic diagram of an example in which a visited network can support assigning of an HA, and a home network does not allow an MS to visit the HA assigned by the visited network according to an embodiment of the invention.

Referring to FIG. 6, the visited network can support assigning of the HA, but the home network does not allow the MS to visit an HA assigned in the visited network. Two newly extended RADIUS attributes will be used in this embodiment.

1. The MS initiates an access authentication process, i.e. CHAP or PAP authentication process performed in establishing a PPP connection by the MS with a PDSN, and the MS transmits authentication data to the PDSN.

2. The PDSN transmits the authentication data of the MS to a RADIUS server of the visited network through an Access-Request message of the RADIUS protocol.

3. Upon reception of the Access-Request message, the RADIUS server of the visited network forwards the message to a RADIUS server of the home network. The message also includes an extended attribute MIP-ASSIGN-HA, which takes a value of 1 indicating that the visited network where the MS is located supports assigning of the HA.

4. The home RADIUS server checks configuration information of the MS, i.e. a profile of the MS, and finds that the MS is an MIP6 MS. The RADIUS server verifies the authentication data of the MS, and if correct, then assigns an HA to the MS in the home network. Also the RADIUS server finds that the received Access-Request message includes the extended attribute MIP-ASSIGN-HA taking the value of 1, thus checks the configuration information of the MS, but finds that the MS is not allowed to visit an HA assigned by the visited network, then can not authorize for assigning the HA to the MS in the visited network.

5. The home RADIUS server transmits an Access-Accept message to the RADIUS server of the visited network. The message includes an address of the HA assigned by the home network, a value of which is placed in an attribute MIP6-Home Agent, and also includes an extended attribute MIP-AUTHOR-ASSIGN-HA, which takes a value of 0 indicating that assigning of the HA can not be authorized in the visited network.

6. The RADIUS server of the visited network forwards the Access-Accept message to the PDSN, and since the home network does not authorize for assigning the HA in the visited network, the RADIUS server of the visited network does not perform assigning of the HA, but simply passes the HA assigned by the home network to the PDSN.

7. The PDSN receives the Access-Accept message, and stores received information of the HA.

8. The PDSN transmits to the MS a message indicating completion of the access authentication process.

9. The MS requests the MIP6-related information from the PDSN through an Information-request message of DHCPv6, and id-type of a Home Network Identifier Option in the message is set as 0 indicating that the MS expects an HA to be assigned in the visited network. The message also includes an identity of the MS.

10. The PDSN finds an appropriate record according to the identity of the MS, and transmits back to the MS a reply message. Since the visited network can not assign any HA to the MS, this message includes the address of the HA in the home network assigned to the MS obtained from RADIUS. The HA uses an identifier to indicate that it has been assigned in the home network, and thus the MS can be informed of this.

With a method for assigning a home agent according to embodiments of present invention, an HA can be assigned dynamically to the MS in the visited network. Therefore, the MS can establish locally a bidirectional tunnel with the HA, and this can reduce a delay due to roundabout data, and thus improve the communication efficiency. Further, the method can enforce an effective control on assignment, so that the visited network can indicate to the home network whether it can support assigning of the HA, and also the home network can enforce a control on whether to perform assignment in the visited network according to a specific user configuration.

Figure 7:
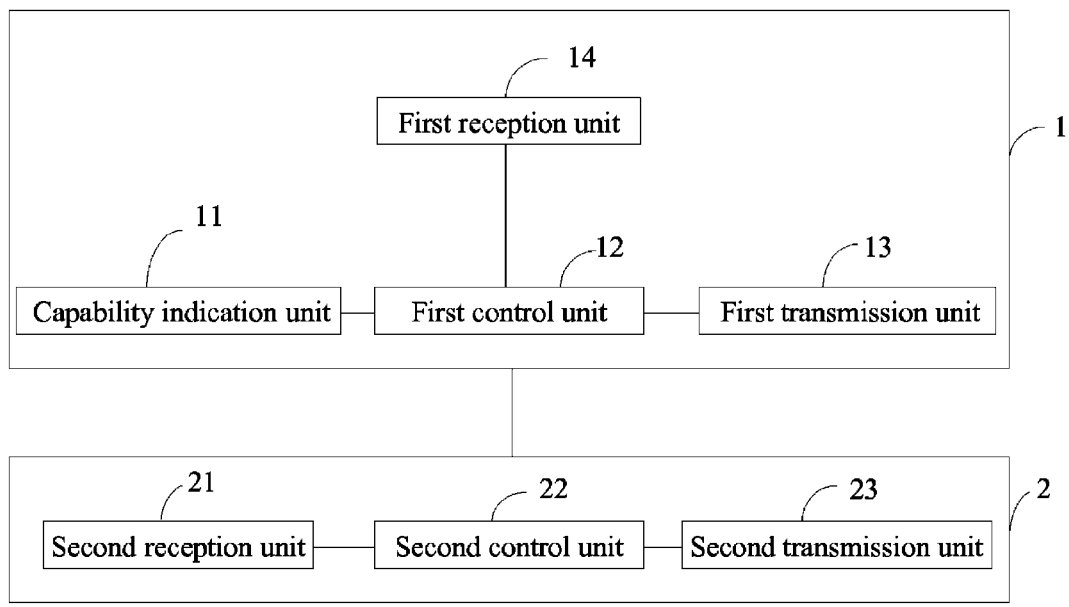
FIG. 7 is a structural schematic diagram of a system for assigning a home agent according to an embodiment of the invention.

Referring to FIG. 7, a system for assigning a home agent includes a visited network 1 and a home network 2. The visited network indicates to the home network whether it is capable of assigning the home agent, and transmits information on an address of the home agent to a mobile node upon reception of a result of authorizing for assigning the home agent from the home network.

Here, the visited network 1 includes a capability indication unit 11, a first control unit 12, a first transmission unit 13, and a first reception unit 14. Particularly, the capability indication unit transmits to the first control unit a capability request indicating whether the visited network is capable of assigning the home agent; the first reception unit receives a result of authorizing for assigning the home agent from the home network, and passes the authorization result to the first control unit; the first control unit transmits the capability request to the first transmission unit, and upon reception of the authorization result, transmits the information on the address of the home agent to the first transmission unit; and the first transmission unit transmits the capability request to the home network, and the information on the address of the home agent to the mobile node.

The home network 2 includes a second reception unit 21, a second control unit 22, and a second transmission unit 23. Particularly, the second reception unit transmits to the second control unit the received capability request indicating whether the visited network is capable of assigning the home agent; upon reception of the capability request, the second control unit generates the result of authorizing the visited network for assigning the home agent and transmits the authorization result to the second transmission unit; and the second transmission unit transmits the authorization result to the visited network.

The above descriptions are only illustrative of the preferred embodiments of the invention, and shall not limit the invention. Any modifications, equivalent substitutions and changes shall be encompassed within the claimed scope of the invention without departing from the spirit and scope of the invention.

What is claimed is:

1. A method for assigning a home agent, comprising:
indicating, by a visited network, to a home network that the visited network supports the home agent assignment;
receiving, by the visited network, authorization information from the home network, the authorization information indicating that the visited network is authorized for assigning the home agent;
receiving, by the visited network, a request message from a mobile node, wherein the request message indicates to obtain the home agent; and
if the request message indicates the mobile node expects to visit the home agent in the visited network or the home agent in the home network, sending, by the visited network, corresponding information about an address of the home agent to the mobile node according to the request message.

2. The method according to claim 1, wherein the visited network is authorized for assigning the home agent if the visited network is capable of assigning the home agent, and a user profile allows the mobile node to access the home agent in the visited network.

3. The method according to claim 1, wherein the method further comprises:
assigning, by the visited network, the information about the address of the home agent after receiving the authorization information for assigning the home agent from the home network.

4. The method according to claim 1, wherein the information about the address of the home agent comprises at least one of an IP address of the home agent, a home subnet prefix and a Fully Qualified Domain Name FQDN of the home agent.

5. The method according to claim 1, wherein the request message indicates the mobile node expects to visit the home agent in the visited network, the method further comprising:
assigning, by the visited network, information about an address of the home agent after receiving the request message of the mobile node.

6. The method according to claim 5, wherein the request message comprises an id-type of a Home Network Identifier Option in the request message that is set as 0 to indicate that the home agent is expected to be assigned in the visited network.

7. A method for assigning a home agent, comprising:
indicating, by a visited network, to a home network that the visited network supports the home agent assignment;
receiving, by the visited network, authorization information from the home network, the authorization information indicates the visited network is authorized for assigning the home agent; and
sending, by the visited network, information about an address of the home agent to a mobile node;
wherein the information about the address of the home agent comprises information on an address of a home agent assigned by the visited network;
wherein the information about the address of the home agent further comprises information on an address of a home agent assigned by the home network;
wherein after receiving the authorization information for assigning the home agent from the home network, the method further comprises receiving a request message to obtain the home agent from the mobile node; and
wherein the step of sending, by the visited network, the information about the address of the home agent to the mobile node comprises:
sending, by the visited network, corresponding information about the address of the home agent to the mobile node according to the request message, if the request message indicates the home agent is excepted to be assigned by the visited network or by the home network; or
sending, by the visited network, the information about the address of the home agent is assigned by the visited network and/or by the home network to the mobile node, if the request message does not indicate the home agent is excepted to be assigned by the visited network or by the home network.

8. A method for assigning a home agent, comprising:
sending, by a mobile node, a request message to a visited network, the request message indicating that the mobile node expects to visit the home agent in the visited network; and
receiving, by the mobile node, information about an address of the home agent in the visited network assigned and sent by the visited network;
wherein the request message comprises an id-type of a Home Network Identifier Option in the request message that is set as 0 to indicate that the mobile node expects the home agent assigned in the visited network.

9. A visited network, comprising a first unit, a receiving unit, and a sending unit, wherein:
the first unit is configured to indicate to a home network that the visited network supports a home agent assignment;
the receiving unit is configured to receive authorization information from the home network, and is configured to receive a request message from a mobile node, the authorization information indicating that the visited network is authorized for assigning the home agent, wherein the request message indicates to obtain the home agent; and
the sending unit is configured to send corresponding information about an address of the home agent to the mobile node according to the request message, if the request message indicates the mobile node expects to visit the home agent in the visited network or the home agent in the home network.

10. The visited network according to claim 9, wherein the visited network is authorized for assigning the home agent if the visited network is capable of assigning the home agent, and a user profile allows the mobile node to access the home agent in the visited network.

11. The visited network according to claim 9, wherein the request message indicates the mobile node expects to visit the home agent in the visited network, the visited network further comprising means for assigning information about an address of the home agent after receiving the authorization information.

12. The visited network according to claim 11, wherein the request message comprises an id-type of a Home Network Identifier Option in the request message that is set as 0 to indicate that the home agent is expected to be assigned in the visited network.

13. A mobile node, comprising:
a transmitter, configured to send a request message to a visited network, the request message indicating that the mobile node expects to visit a home agent in the visited network; and
a receiver, configured to receive information about an address of the home agent in the visited network assigned and sent by the visited network;
wherein the request message comprises an id-type of a Home Network Identifier Option in the request message that is set as 0 to indicate that the mobile node expects the home agent assigned in the visited network.

* * * * *